(12) United States Patent
Richard (10) Patent No.: US 11,895,389 B2
(45) Date of Patent: Feb. 6, 2024

(54) VIDEO DISPLAY TWO WAY MIRROR ASSEMBLY

(71) Applicant: Adrian Richard, Dallas, TX (US)

(72) Inventor: Adrian Richard, Dallas, TX (US)

( * ) Notice: Subject to any disclaimer, the term of this patent is extended or adjusted under 35 U.S.C. 154(b) by 400 days.

(21) Appl. No.: 17/329,963

(22) Filed: May 25, 2021

(65) Prior Publication Data
US 2022/0385793 A1   Dec. 1, 2022

(51) Int. Cl.

| | |
|---|---|
| *G06F 1/16* | (2006.01) |
| *H04N 23/57* | (2023.01) |
| *G06F 3/041* | (2006.01) |
| *A47G 1/02* | (2006.01) |
| *H04N 5/38* | (2006.01) |
| *G06T 11/00* | (2006.01) |
| *H04N 23/56* | (2023.01) |
| *H04N 23/62* | (2023.01) |
| *H04N 23/80* | (2023.01) |
| *H04N 23/63* | (2023.01) |
| *H04N 23/667* | (2023.01) |
| *H04R 1/02* | (2006.01) |

(52) U.S. Cl.
CPC ............... *H04N 23/57* (2023.01); *A47G 1/02* (2013.01); *G06F 1/1605* (2013.01); *G06F 1/1683* (2013.01); *G06F 3/041* (2013.01); *G06T 11/00* (2013.01); *H04N 5/38* (2013.01); *H04N 23/56* (2023.01); *H04N 23/62* (2023.01); *H04N 23/633* (2023.01); *H04N 23/667* (2023.01); *H04N 23/80* (2023.01); *H04R 1/028* (2013.01)

(58) Field of Classification Search
CPC .......... H04N 23/57; H04N 5/38; H04N 23/56; H04N 23/62; H04N 23/633; H04N 23/667; H04N 23/80; H04N 7/183; H04N 2005/2726; A47G 1/02; G06F 1/1605; G06F 1/1683; G06F 3/041; G06T 11/00; H04R 1/028; H04R 1/025; H04R 2499/15
See application file for complete search history.

(56) References Cited

U.S. PATENT DOCUMENTS

| | | | | |
|---|---|---|---|---|
| 4,771,300 A | * | 9/1988 | Bryan | G03B 15/06 396/428 |
| 8,433,444 B2 | * | 4/2013 | Lee | G02B 7/1827 700/275 |
| 9,122,320 B1 | * | 9/2015 | Rowles | G06F 3/0317 |
| 9,348,198 B1 | * | 5/2016 | Adams | H04N 23/66 |
| 9,648,217 B2 | | 5/2017 | Kaiser | |
| 10,142,592 B1 | | 11/2018 | Van Ness | |

(Continued)

FOREIGN PATENT DOCUMENTS

EP         3358402         8/2018

*Primary Examiner* — Abhishek M Rathod (57) ABSTRACT

A video display two way mirror assembly for taking self pictures without holding a device includes a personal electronic device that has an electronic display to display imagery for a user. A housing is vertically oriented on a support surface to facilitate a user to stand in front of the housing. A camera is integrated into the housing to capture imagery of the user. A two way mirror is integrated into the housing to facilitate the user to view a reflection of themselves in the two way mirror, and a display is positioned behind the two way mirror. The display displays indicia comprising imagery to facilitate the user to view the image captured by the camera superimposed onto the reflection of themselves.

7 Claims, 5 Drawing Sheets

(56) References Cited

U.S. PATENT DOCUMENTS

| | | | |
|---|---|---|---|
| 10,495,950 B2* | 12/2019 | Kaiser | H04N 23/51 |
| 10,554,878 B2 | 2/2020 | Lyle | |
| 2007/0040033 A1* | 2/2007 | Rosenberg | G06F 3/0481 |
| | | | 235/462.36 |
| 2008/0225123 A1* | 9/2008 | Osann | A47F 11/04 |
| | | | 348/E11.007 |
| 2016/0248981 A1* | 8/2016 | Pauls | H04N 23/53 |
| 2017/0059970 A1* | 3/2017 | Nieves | G03B 17/566 |
| 2018/0359376 A1* | 12/2018 | Krause | H04N 23/62 |
| 2019/0250781 A1* | 8/2019 | Savitski | H04M 1/72436 |
| 2020/0008592 A1* | 1/2020 | Meyers | G06F 3/02 |
| 2021/0409579 A1* | 12/2021 | Davidson, II | H04N 23/56 |
| 2022/0134210 A1* | 5/2022 | Popescu | A63B 71/0622 |
| | | | 482/1 |
| 2022/0192346 A1* | 6/2022 | Mouizina | H04N 5/272 |

\* cited by examiner

VIDEO DISPLAY TWO WAY MIRROR ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to two way mirror device and more particularly pertains to a new two way mirror device for taking self pictures without holding a device. The device includes a display that is integrated into a mirror and a camera integrated into the mirror. The camera is in remote communication with a personal electronic device. In this way a user can take self pictures while posing in front of the mirror which are communicated to the personal electronic device.

(2) Description of Related Art Including Information Disclosed Under 37 CFR 1.97 and 1.98

The prior art relates to two way mirror devices including a variety of mirrors that have a camera integrated into the mirror for photographing a user. The prior art discloses a smart mirror that has video conferencing capabilities thereby facilitating video chat. In no instance does the prior art disclose a two way mirror device that is in communication with a personal electronic device and which includes a camera and image manipulation software.

BRIEF SUMMARY OF THE INVENTION

An embodiment of the disclosure meets the needs presented above by generally comprising a personal electronic device that has an electronic display to display imagery for a user. A housing is vertically oriented on a support surface to facilitate a user to stand in front of the housing. A camera is integrated into the housing to capture imagery of the user. A two way mirror is integrated into the housing to facilitate the user to view a reflection of themselves in the two way mirror, and a display is positioned behind the two way mirror. The display displays indicia comprising imagery to facilitate the user to view the image captured by the camera superimposed onto the reflection of themselves.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
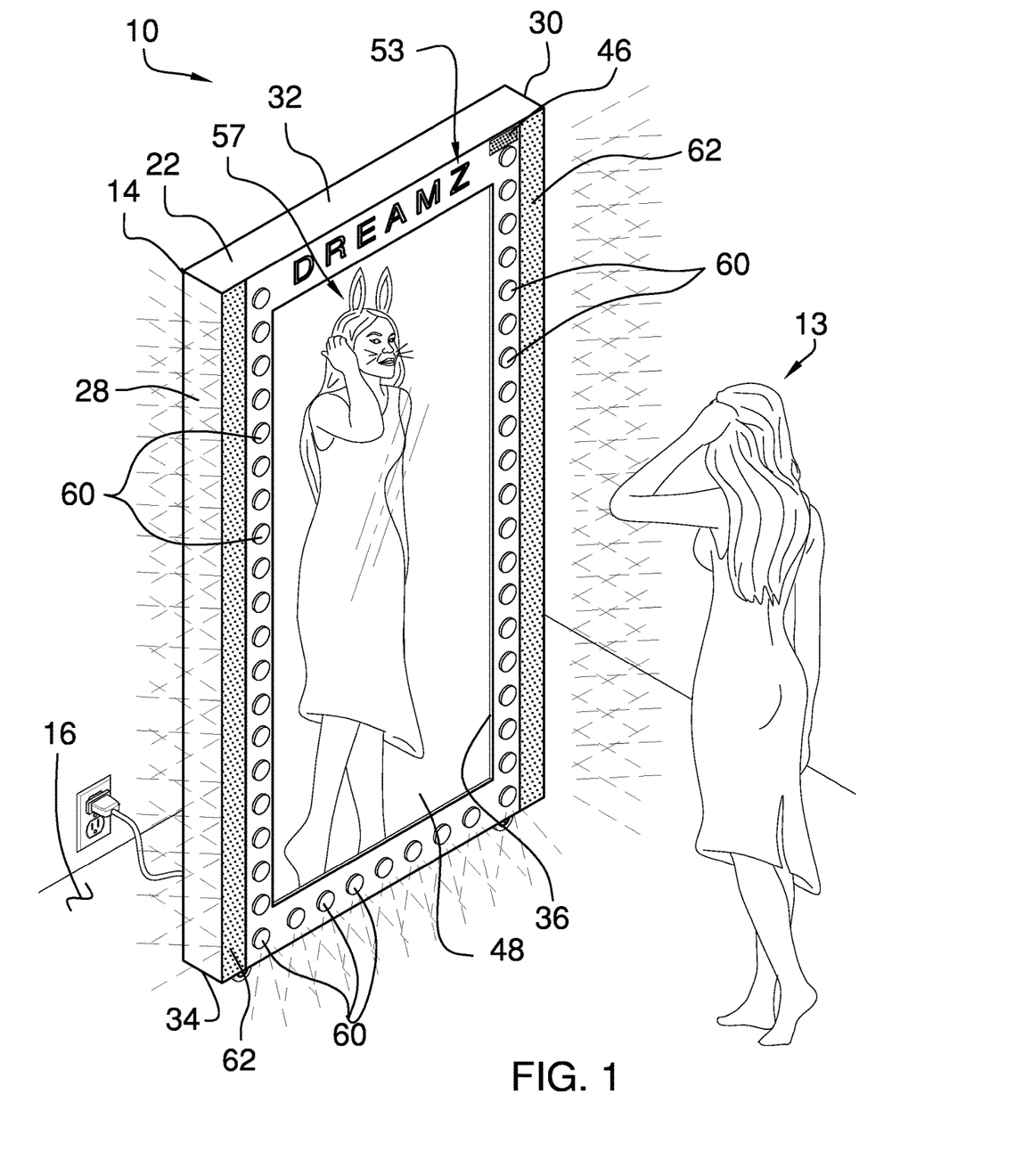
FIG. 1 is a perspective view of a video display two way mirror assembly according to an embodiment of the disclosure.
Figure 2:
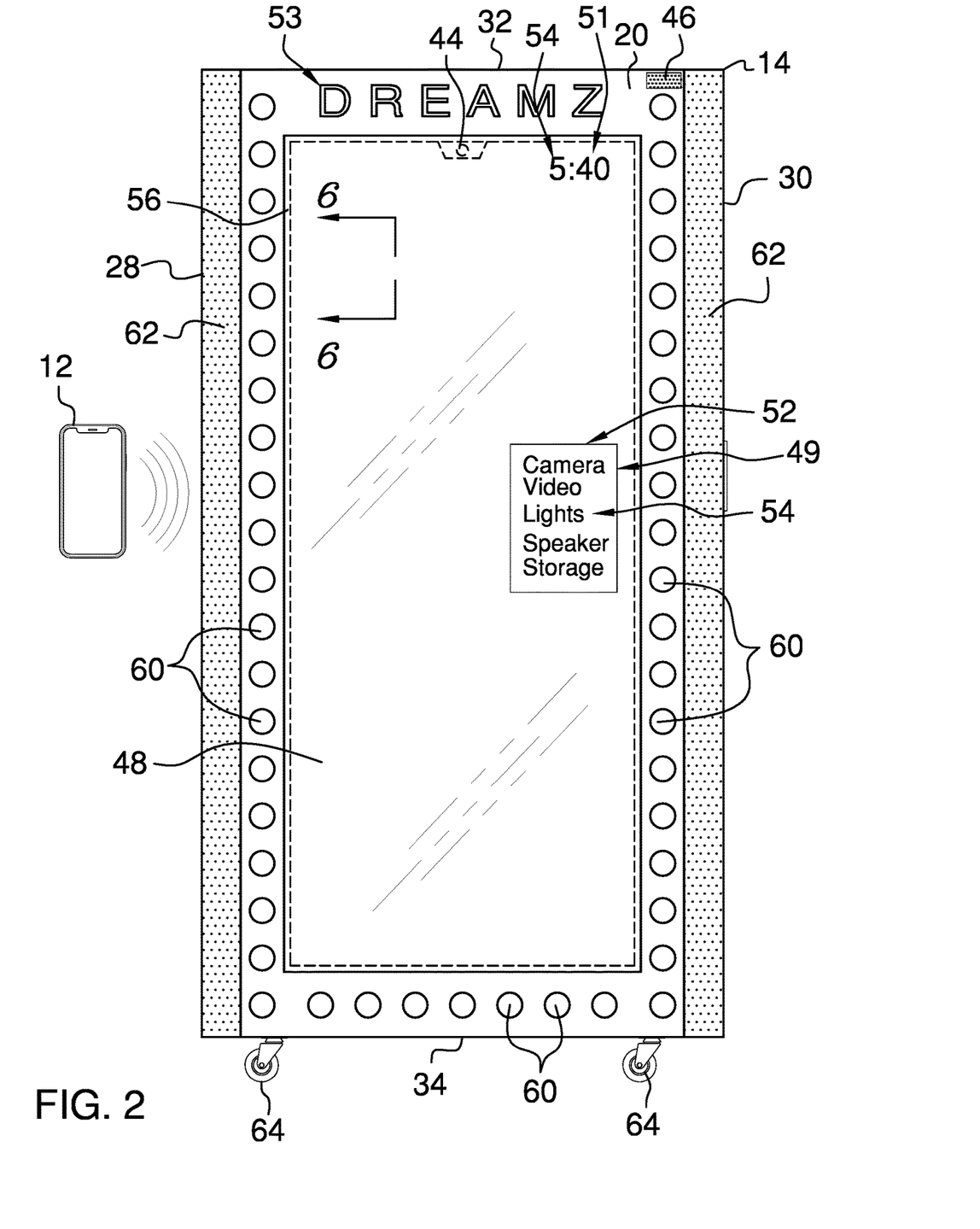
FIG. 2 is a front view of an embodiment of the disclosure.
Figure 3:
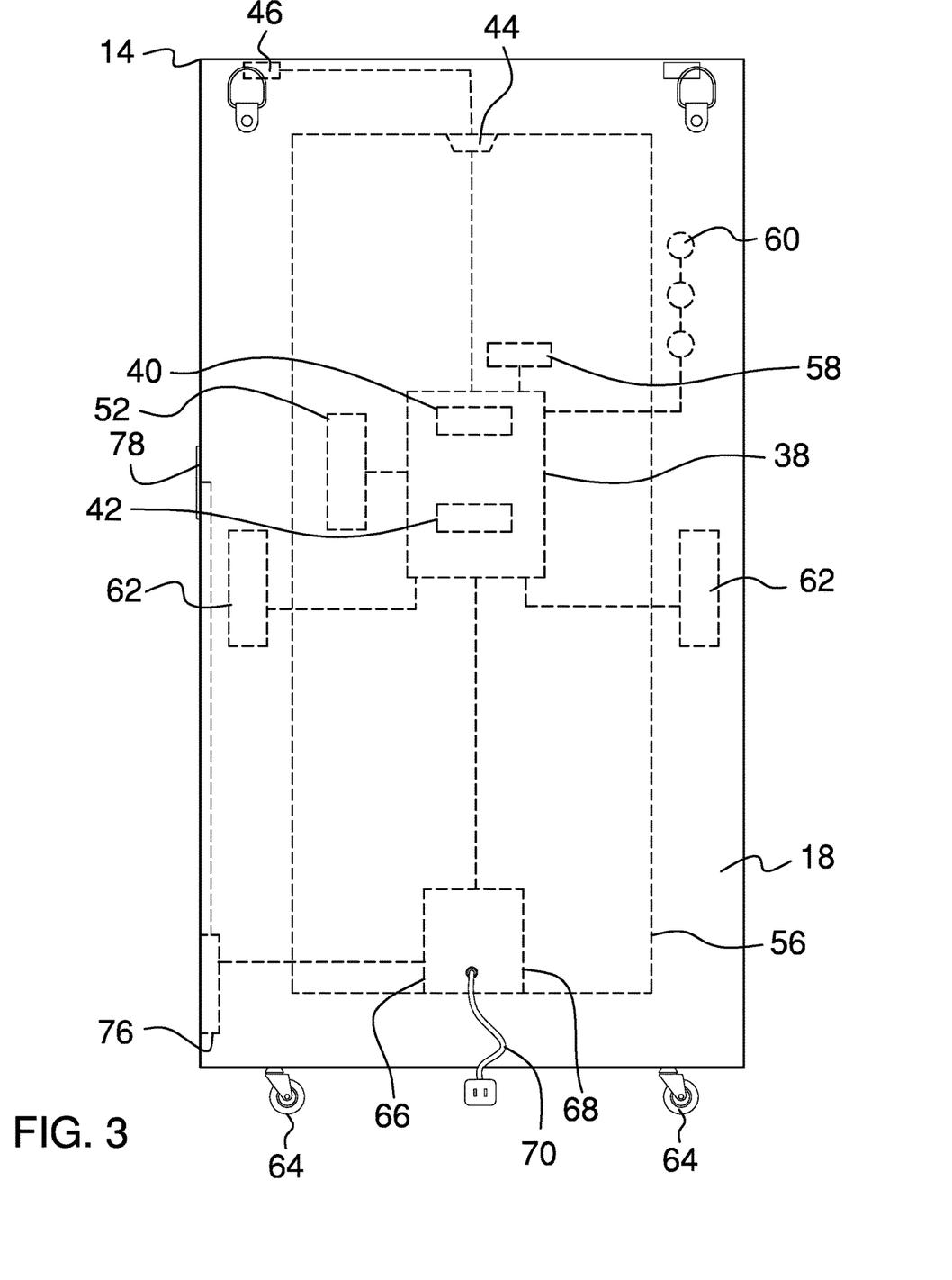
FIG. 3 is a back phantom view of an embodiment of the disclosure.
Figure 4:
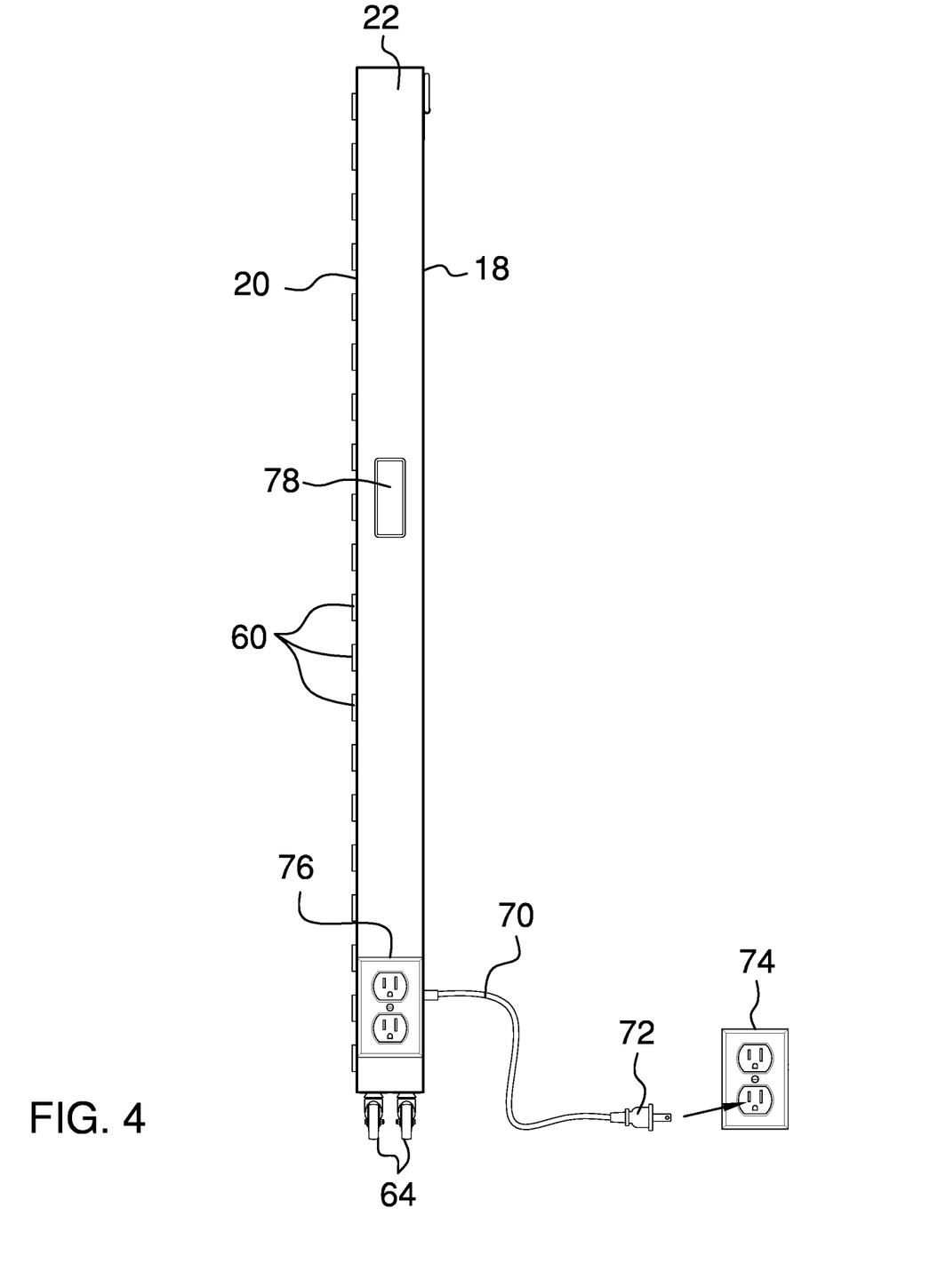
FIG. 4 is a left side view of an embodiment of the disclosure.
Figure 5:
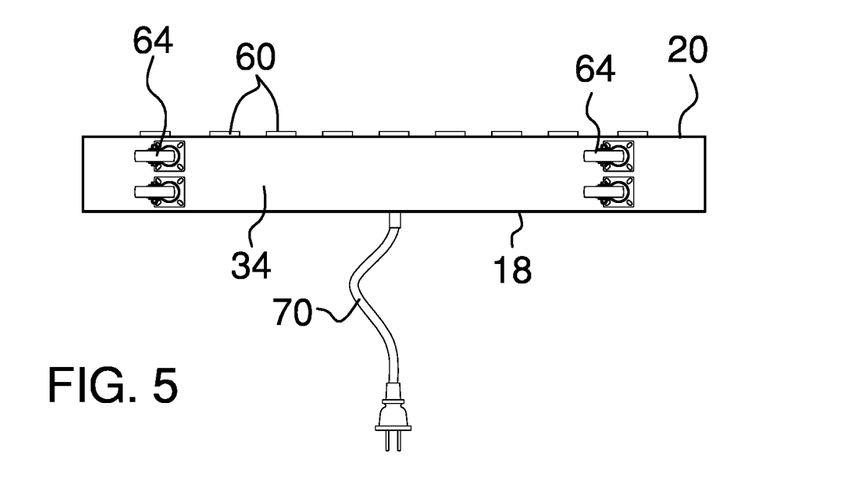
FIG. 5 is a bottom view of an embodiment of the disclosure.
Figure 6:
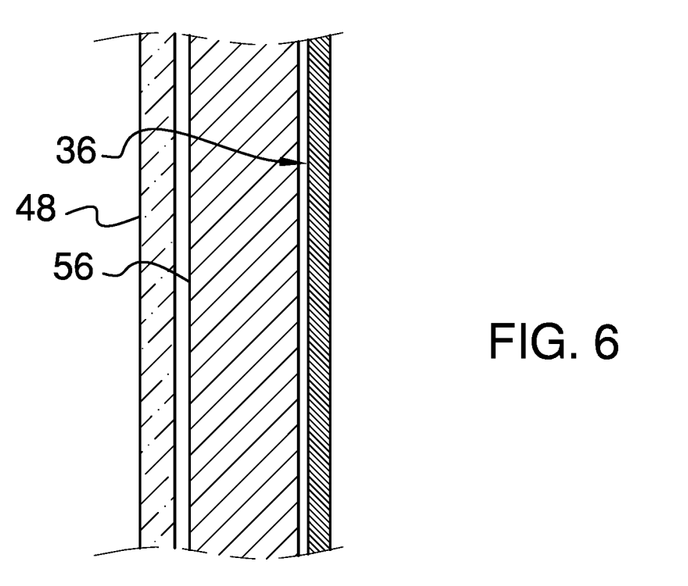
FIG. 6 is a cross sectional view taken along line 6-6 of an embodiment of the disclosure.

With reference now to the drawings, and in particular to FIGS. 1 through 6 thereof, a new two way mirror device embodying the principles and concepts of an embodiment of the disclosure and generally designated by the reference numeral 10 will be described.

As best illustrated in FIGS. 1 through 6, the video display two way mirror assembly 10 generally comprises a personal electronic device 12 that has an electronic display to display imagery for a user 13. The personal electronic device 12 may comprise a smart phone or other similar device that has wireless communication capabilities. A housing 14 is provided and the housing 14 is vertically oriented on a support surface 16 to facilitate a user 13 to stand in front of the housing 14. The housing 14 has a back wall 18, a front wall 20 and a perimeter wall 22 extending between the front side 24 and the back side 26, and the perimeter wall 22 has a first lateral side 28, a second lateral side 30, a top side 32 and a bottom side 34. The front wall 20 has a recess 36 extending toward the back side 26, and the recess 36 extends over a substantial area of the front wall 20.

A control circuit 38 is integrated into the housing 14 and the control circuit 38 includes an electronic memory 40. The electronic memory 40 stores data comprising image manipulation software. The image manipulation software might include a variety of avatars, images of clothing, a variety of backgrounds, faces of celebrities and other types of image content that a user 13 might wish to overlay onto photos of themselves. The control circuit 38 includes an electronic timer 42 and the electronic timer 42 counts down a video countdown or an image countdown.

A camera 44 is integrated into the housing 14 to capture imagery of the user 13 and the camera 44 is positioned on the front wall 20 of the housing 14. The camera 44 is in remote communication with the personal electronic device 12 thereby facilitating the camera 44 to communicate imagery captured by the camera 44 to the personal electronic device 12. In this way the camera 44 can facilitate the user 13 to capture and subsequently view a picture of themselves without having to hold a device. The camera 44 is electrically coupled to the control circuit 38 thereby facilitating the image manipulation software to digitally alter the imagery captured by the camera 44. In this way the control circuit 38 facilitates the user 13 to alter the picture of themselves in a variety of ways. Additionally, the camera 44 is actuatable into an image condition to capture still imagery and the camera 44 is actuatable into a video condition to capture video. The camera 44 may be a digital camera of any conventional design that can capture both video imagery and still imagery.

A microphone 46 is integrated into the housing 14 to capture audible sound and the microphone 46 is electrically coupled to the control circuit 38. The microphone 46 facilitates the user 13 to record audio to be recorded with video imagery recorded with the camera 44. The microphone 46 may be an electronic microphone of any conventional design.

A two way mirror 48 is integrated into the housing 14 to facilitate the user 13 to view a reflection of themselves in the two way mirror 48. The two way mirror 48 is positioned in the recess 36 in the front wall 20 such that a front surface 50 of the two way mirror 48 lies flush with the front wall 20 of the housing 14, and the two way mirror 48 completely fills the recess 36. The two way mirror 48 has a touch screen portion 52 that is integrated into the two way mirror 48 and the touch screen portion 52 responds to the user 13's touch. The touch screen portion 52 is electrically coupled to the control circuit 38 and the touch screen portion 52 displays indicia 54 comprising words communicating menu options. In this way the touch screen portion 52 facilitates the camera 44 to be actuated into either the image condition or the video condition. Thus, the touch screen portion 52 facilitates the user 13 to choose between still imagery or video imagery. As is most clearly shown in FIGS. 1 and 2, indicia 53 comprising the word "dreamz" may be printed on the front wall 20 of the housing between the two way mirror 48 and the top side 32 of the perimeter wall 22 of the housing 14.

The touch screen portion 52 displays indicia 54 comprising numbers to communicate the video countdown when the camera 44 is actuated into the video condition to communicate to the user 13 how long the video will be recorded. The video countdown may be a maximum of two minutes, and the video countdown may display red numbers when the video countdown reaches thirty seconds to visually alert the user 13 that the video countdown is about to end. The touch screen portion 52 displays indicia 54 comprising numbers to communicate the image countdown when the camera 44 is actuated into the image condition. In this way the touch screen portion 52 can communicate to the user 13 the amount of time between each photo being taken to facilitate the user 13 to pose for each photo. As is most clearly shown in FIG. 2, the touch screen portion 52 may include separate locations for the menu options 49 and the video countdown 51.

A display 56 is integrated into the housing 14 and the display 56 is positioned behind the two way mirror 48. The display 56 is visible through the two way mirror 48 when the display 56 is turned on. The display 56 displays indicia 57 comprising imagery to facilitate the user 13 to view the imagery superimposed onto the reflection of themselves. The display 56 is electrically coupled to the control circuit 38 and the display 56 receives the manipulated image from the electronic memory 40 thereby facilitating the display 56 to display the manipulated image. Moreover, the imagery displayed by the display 56 may include avatars, clothing, backgrounds, faces of celebrities and any other types of imagery contained in the image manipulation software that have been superimposed over the image of the user 13 captured by the camera 44.

A transmitter 58 is integrated into the housing 14, the transmitter 58 is electrically coupled to the control circuit 38 and the transmitter 58 is in wireless communication with the personal electronic device 12. The transmitter 58 broadcasts the imagery captured by the camera 44 to the personal electronic device 12 thereby facilitating the imagery to be stored and subsequently viewed on the personal electronic device 12. The transmitter 58 may comprise a radio frequency transmitter or the like and the transmitter 58 may employ Bluetooth communication protocols.

A plurality of light emitters 60 is each integrated into the housing 14 to emit light outwardly therefrom. The plurality of light emitters 60 is arranged to extend around the two way mirror 48 to illuminate the user 13 when the user 13 stands in front of the two way mirror 48. The plurality of light emitters 60 is positioned on the front wall 20 of the housing 14 and the light emitters 60 are positioned between the recess 36 and the perimeter wall 22 of the housing 14. Moreover, the light emitters 60 are distributed along the first lateral side 28, the second lateral side 30 and the bottom side 34 of the perimeter wall 22. Each of the light emitters 60 may comprise a light emitting diode or other type of electronic light emitter.

A pair of speakers 62 is provided and each of the speakers 62 is integrated into the housing 14 to emit audible sound outwardly therefrom. Each of the speakers 62 is electrically coupled to the control circuit 38 and each of the speakers 62 is positioned on the front wall 20 of the housing 14. Each of the speakers 62 extends between the top side 32 and the bottom side 34 of the perimeter wall 22, and each of the speakers 62 is aligned with a respective one of the first lateral side 28 and the second lateral side 30 of the perimeter wall 22. Additionally, each of the speakers 62 may comprise an electronic speaker of any conventional design and the speakers 62 might emit audio received from a Bluetooth device via the transmitter 58.

A plurality of rollers 64 is provided and each of the rollers 64 is removably attached to the housing 14 to roll the housing 14 along the support surface 16. Each of the rollers 64 is positioned on the bottom side 34 of the perimeter wall 22 of the housing 14 and each of the rollers 64 is aligned with a respective one of four corners of the bottom side 34. Each of the rollers 64 may comprise a caster or the like. Additionally, each of the rollers 64 may engage a recess, or other engagement point, on the bottom side 34 of the perimeter wall 22.

A power supply 66 is integrated into the housing 14 and the power supply 66 is electrically coupled to the control circuit 38. The power supply 66 comprises at least one battery 68 that is positioned in the housing 14, and the at least one battery 68 is electrically coupled to the control circuit 38. A power cord 70 is removably attached to the back wall 18 of the housing 14 and the power cord 70 is in electrical communication with the control circuit 38 when the power cord 70 is attached to the back wall 18. The back wall 18 may have a power port or the like that can electrically engage the power cord 70. Moreover, the power cord 70 has a male plug 72 that is electrically coupled thereto thereby facilitating the male plug 72 to be plugged into a female electrical outlet 74. The at least one battery 68 supplies electrical power to the control circuit 38 when the power cord 70 is not attached to the back wall 18.

An outlet 76 is integrated the perimeter wall 22 of the housing 14 and the outlet 76 is electrically coupled to the power cord 70 when the power cord 70 is attached to the back wall 18 to supply electrical power for an electronic device. The outlet 76 may comprise a female electrical outlet or the like. A power switch 78 is movably integrated into the perimeter wall 22 of the housing 14, the power switch 78 is electrically coupled to the control circuit 38 and the power switch 78 turns the control circuit 38 on and off.

In use, the personal electronic device 12 is synchronized with the transmitter 58 to facilitate secure communication between the personal electronic device 12 and the camera 44. The user 13 employs the touch screen portion 52 of the two way mirror 48 to choose either still photos or video to actuate the camera 44. The user 13 can view themselves in the two way mirror 48 as they pose for the camera 44 to take photos or video. In this way the user 13 can take a selfie without being required to hold a device as is commonly required with a smart phone. Additionally, the photo or video can be edited with respect to clothing, costumes and the background of the image. In this way the user 13 can customize the photo in nearly unlimited ways to simulate the user 13's professional aspirations, for example, or to simulate the user 13 in a vacation destination, for example. The display 56 can display imagery that is visible through the two way mirror 48 to facilitate the user 13 to view themselves with digitally rendered clothing, accessories or even another person's face, such as a celebrity or fictional character.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A video display two way mirror assembly for capturing and displaying a digital image of a user, said assembly comprising:

a personal electronic device having an electronic display wherein said electronic display is configured to display imagery for a user;

a housing being vertically oriented on a support surface wherein said housing is oriented to facilitate a user to stand in front of said housing;

a camera being integrated into said housing wherein said camera is configured to capture imagery of the user, said camera being in remote communication with said personal electronic device thereby facilitating said camera to communicate imagery captured by said camera to said personal electronic device wherein said camera is configured to facilitate the user to capture and subsequently view a picture of themselves without having to hold a device, said camera being in remote communication with said personal electronic device thereby communicating the imagery to said personal electronic device for storage and subsequent viewing;

a two way mirror being integrated into said housing wherein said two way mirror is configured to facilitate the user to view a reflection of themselves in said two way mirror;

a display being integrated into said housing, said display being positioned behind said two way mirror, said display being visible through said two way mirror when said display is turned on, said display displaying indicia comprising customizable imagery wherein said display is configured to facilitate the user to view the customizable imagery superimposed onto the reflection of themselves;

a plurality of light emitters, each of said light emitters being integrated into said housing wherein each of said light emitters is configured to emit light outwardly therefrom, said plurality of light emitters being arranged to extend around said two way mirror wherein said plurality of light emitters is configured to illuminate the user when the user stands in front of said two way mirror;

a pair of speakers, each of said speakers being integrated into said housing wherein each of said speakers is configured to emit audible sound outwardly therefrom; and a plurality of rollers, each of said rollers being removably attached to said housing wherein each of said rollers is configured to roll said housing along the support surface.

2. The assembly according to claim 1, wherein:

said housing has a back wall, a front wall and a perimeter wall extending between said front side and said back side, said perimeter wall having a first lateral side, a second lateral side, a top side and a bottom side, said front wall having a recess extending toward said back side, said recess extending over a substantial area of said front wall;

said camera is positioned on said front wall of said housing;

said two way mirror is positioned in said recess in said front wall such that a front surface of said two way mirror lies flush with said front wall of said housing, said two way mirror completely filling said recess;

said plurality of light emitters is positioned on said front wall of said housing, said light emitters being positioned between said recess and said perimeter wall of said housing, said light emitters being distributed along said first lateral side, said second lateral side and said bottom side of said perimeter wall;

each of said speakers is positioned on said front wall of said housing, each of said speakers extending between said top side and said bottom side of said perimeter wall, each of said speakers being aligned with a respective one of said first lateral side and said second lateral side of said perimeter wall; and each of said rollers is positioned on said bottom side of said perimeter wall of said housing, each of said rollers being aligned with a respective one of four corners of said bottom side.

3. The assembly according to claim 1, wherein:

said assembly includes a control circuit being integrated into said housing, said control circuit including an electronic memory, said electronic memory storing data comprising image manipulation software, said control circuit including an electronic timer, said electronic timer counting down a video countdown or an image countdown;

said camera is electrically coupled to said control circuit thereby facilitating said image manipulation software to digitally alter the imagery captured by said camera wherein said control circuit is configured to facilitate the user to alter the picture of themselves in a variety of ways, said camera being actuatable into an image condition to capture still imagery, said camera being actuatable into a video condition to capture video; and said display is electrically coupled to said control circuit, said display receiving the manipulated image from said electronic memory thereby facilitating said display to display the manipulated image.

4. The assembly according to claim 3, further comprising a transmitter being integrated into said housing, said transmitter being electrically coupled to said control circuit, said transmitter being in wireless communication with said personal electronic device, said transmitter broadcasting the imagery captured by said camera to said personal electronic device thereby facilitating the imagery to be stored and subsequently viewed on said personal electronic device.

5. The assembly according to claim 3, further comprising a power supply being integrated into said housing, said power supply being electrically coupled to said control circuit, said power supply comprising:

at least one battery being positioned in said housing, said at least one battery being electrically coupled to said control circuit;

a power cord being removably attached to said back wall of said housing, said power cord being in electrical communication with said control circuit when said power cord is attached to said back wall, said power cord having a male plug being electrically coupled thereto wherein said male plug is configured to be plugged into a female electrical outlet, said at least one battery supplying electrical power to said control circuit when said power cord is not attached to said back wall;

an outlet being integrated said perimeter wall of said housing, said outlet being electrically coupled to said power cord when said power cord is attached to said back wall wherein said outlet is configured to supply electrical power for an electronic device; and a power switch being movably integrated into said perimeter wall of said housing, said power switch being electrically coupled to said control circuit, said power switch turning said control circuit on and off.

6. The assembly according to claim 3, wherein:

said two way mirror has a touch screen portion being integrated therein wherein said touch screen portion is configured to respond to the user's touch, said touch screen portion being electrically coupled to said control circuit;

said touch screen portion displays indicia comprising words communication menu options thereby facilitating said camera to be actuated into either said image condition or said video condition wherein said touch screen is configured to facilitate the user to choose between still imagery or video imagery;

said touch screen portion displays indicia comprising numbers to communicate said video countdown when said camera is actuated into said video condition wherein said touch screen portion is configured to communicate to the user how long the video will be recorded; and said touch screen portion displays indicia comprising numbers to communicate said image countdown when said camera is actuated into said image condition wherein said touch screen portion is configured to communicate to the user the amount of time between each photo being taken.

7. A video display two way mirror assembly for capturing and displaying a digital image of a user, said assembly comprising:

a personal electronic device having an electronic display wherein said electronic display is configured to display imagery for a user;

a housing being vertically oriented on a support surface wherein said housing is oriented to facilitate a user to stand in front of said housing, said housing having a back wall, a front wall and a perimeter wall extending between said front side and said back side, said perimeter wall having a first lateral side, a second lateral side, a top side and a bottom side, said front wall having a recess extending toward said back side, said recess extending over a substantial area of said front wall;

a control circuit being integrated into said housing, said control circuit including an electronic memory, said electronic memory storing data comprising image manipulation software, said control circuit including an electronic timer, said electronic timer counting down a video countdown or an image countdown;

a camera being integrated into said housing wherein said camera is configured to capture imagery of the user, said camera being positioned on said front wall of said housing, said camera being in remote communication with said personal electronic device thereby facilitating said camera to communicate imagery captured by said camera to said personal electronic device wherein said camera is configured to facilitate the user to capture and subsequently view a picture of themselves without having to hold a device, said camera being electrically coupled to said control circuit thereby facilitating said image manipulation software to digitally alter the imagery captured by said camera wherein said control circuit is configured to facilitate the user to alter the picture of themselves in a variety of ways, said camera being actuatable into an image condition to capture still imagery, said camera being actuatable into a video condition to capture video;

a microphone being integrated into said housing wherein said microphone is configured to capture audible sound, said microphone being electrically coupled to said control circuit;

a two way mirror being integrated into said housing wherein said two way mirror is configured to facilitate the user to view a reflection of themselves in said two way mirror, said two way mirror being positioned in said recess in said front wall such that a front surface of said two way mirror lies flush with said front wall of said housing, said two way mirror completely filling said recess, said two way mirror having a touch screen portion being integrated therein wherein said touch screen portion is configured to respond to the user's touch, said touch screen portion being electrically coupled to said control circuit, said touch screen portion displaying indicia comprising words communication menu options thereby facilitating said camera to be actuated into either said image condition or said video condition wherein said touch screen is configured to facilitate the user to choose between still imagery or video imagery, said touch screen portion displaying indicia comprising numbers to communicate said video countdown when said camera is actuated into said video condition wherein said touch screen portion is configured to communicate to the user how long the video will be recorded, said touch screen portion displaying indicia comprising numbers to communicate said image countdown when said camera is actuated into said image condition wherein said touch screen portion is configured to communicate to the user the amount of time between each photo being taken;

a display being integrated into said housing, said display being positioned behind said two way mirror, said display being visible through said two way mirror when said display is turned on, said display displaying indicia comprising customizable imagery wherein said display is configured to facilitate the user to view the customizable imagery superimposed onto the reflection of themselves, said display being electrically coupled to said control circuit, said display receiving the manipulated image from said electronic memory thereby facilitating said display to display the manipulated image;

a transmitter being integrated into said housing, said transmitter being electrically coupled to said control circuit, said transmitter being in wireless communication with said personal electronic device, said transmitter broadcasting the imagery captured by said camera to said personal electronic device thereby facilitating the imagery to be stored and subsequently viewed on said personal electronic device;

a plurality of light emitters, each of said light emitters being integrated into said housing wherein each of said light emitters is configured to emit light outwardly therefrom, said plurality of light emitters being arranged to extend around said two way mirror wherein said plurality of light emitters is configured to illuminate the user when the user stands in front of said two way mirror, said plurality of light emitters being positioned on said front wall of said housing, said light emitters being positioned between said recess and said perimeter wall of said housing, said light emitters being distributed along said first lateral side, said second lateral side and said bottom side of said perimeter wall;

a pair of speakers, each of said speakers being integrated into said housing wherein each of said speakers is configured to emit audible sound outwardly therefrom, each of said speakers being electrically coupled to said control circuit, each of said speakers being positioned on said front wall of said housing, each of said speakers extending between said top side and said bottom side of said perimeter wall, each of said speakers being aligned with a respective one of said first lateral side and said second lateral side of said perimeter wall;

a plurality of rollers, each of said rollers being removably attached to said housing wherein each of said rollers is configured to roll said housing along the support surface, each of said rollers being positioned on said bottom side of said perimeter wall of said housing, each of said rollers being aligned with a respective one of four corners of said bottom side; and a power supply being integrated into said housing, said power supply being electrically coupled to said control circuit, said power supply comprising:

at least one battery being positioned in said housing, said at least one battery being electrically coupled to said control circuit;

a power cord being removably attached to said back wall of said housing, said power cord being in electrical communication with said control circuit when said power cord is attached to said back wall, said power cord having a male plug being electrically coupled thereto wherein said male plug is configured to be plugged into a female electrical outlet, said at least one battery supplying electrical power to said control circuit when said power cord is not attached to said back wall;

an outlet being integrated said perimeter wall of said housing, said outlet being electrically coupled to said power cord when said power cord is attached to said back wall wherein said outlet is configured to supply electrical power for an electronic device; and a power switch being movably integrated into said perimeter wall of said housing, said power switch being electrically coupled to said control circuit, said power switch turning said control circuit on and off.

* * * * *